July 27, 1943.    J. B. HOLMES ET AL    2,325,319
VEHICLE SIGNAL
Filed Dec. 12, 1941
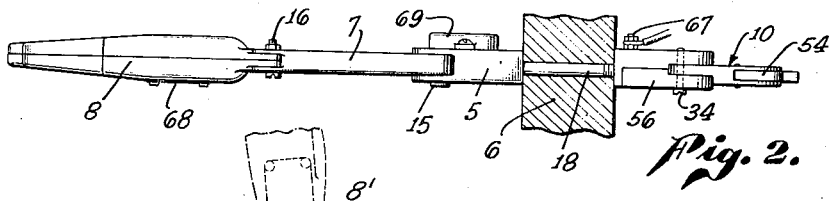
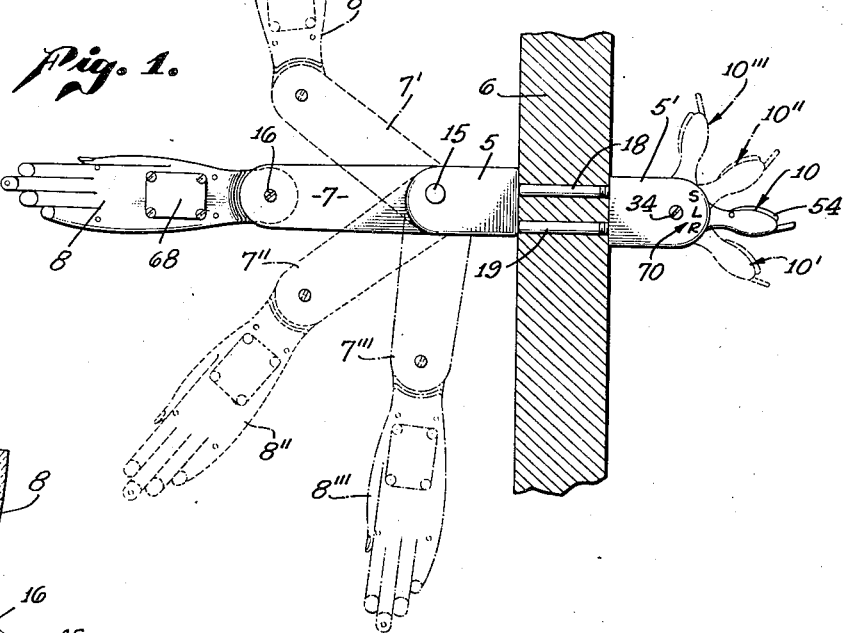
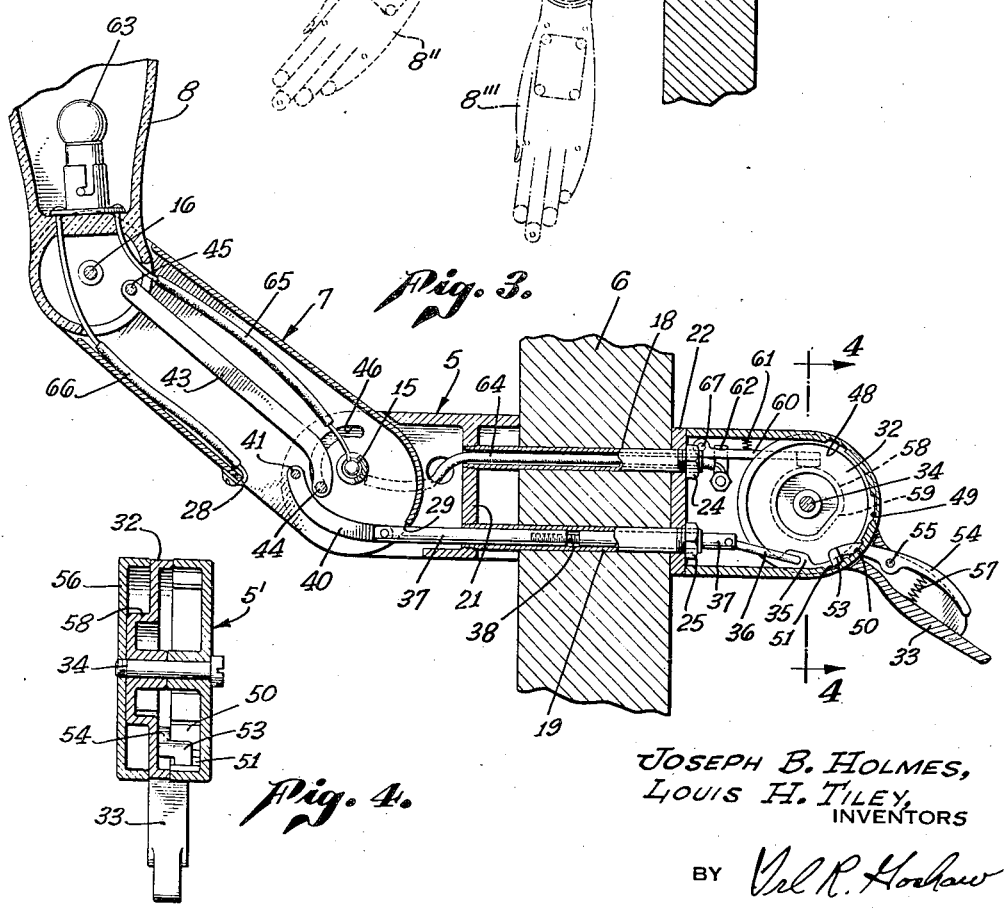
JOSEPH B. HOLMES,
LOUIS H. TILEY,
INVENTORS
BY *Val R. Horlow*
ATTORNEY Patented July 27, 1943

2,325,319

UNITED STATES PATENT OFFICE 2,325,319

VEHICLE SIGNAL

Joseph B. Holmes, Los Angeles, Calif., and Louis H. Tiley, Fort Collins, Colo.

Application December 12, 1941, Serial No. 422,668

4 Claims. (Cl. 177—327)

This invention relates to signaling devices and particularly to a signaling device for motor vehicles which simulates the movements of an operator's hand to provide indications of the operator's intentions.

There are several types of such signaling devices known in the art, such as those in the form of an arrow and as shown in U. S. Patent 2,081,805 of May 25, 1937, and the hand type such as shown in U. S. Patent 1,646,675 of October 25, 1927. Applicants' invention is of the general type shown in the latter patent, wherein a hand is provided at the extremity of the signaling arm. It has been found, however, that such a device in order to pass the rigid safety regulations of some state motor vehicle divisions, must have a positive action, be rugged, and not be subject to failures caused by inclement weather, when the signaling device is most frequently used.

The type of signal shown in Patent 2,081,805 employs a cable which does not have a positive action in both directions but depends on gravity and a brake stabilizer to move and control it, in one direction. Also, the type of signal shown in Patent 1,646,675 utilizes a spring action for maintaining the signal in any adjusted position. Furthermore, the structures of these patents do not accurately simulate the arm positions necessary to provide the proper signals.

The present invention is directed to an arm signal which is sturdy and rugged and which, at all times, is under the direct positive control of the operator. It is also adapted to provide both elbow and wrist actions which may exactly duplicate these of an operator's signaling arm and, when adjusted to any particular position, it will be maintained in that position by a positive latch.

The principal object of the invention, therefore, is to facilitate signaling from motor vehicles.

Another object of the invention is to provide a mechanical arm signal to simulate an operator's arm for a given set of signals.

A further object of the invention is to provide a signal easily attachable to any type of motor vehicle wall or door.

A further object of the invention is to provide a signal which is positively controlled by the operator at all positions and which is suitable for night driving.

Although the novel features which are believed to be characteristic of this invention are pointed out with particularity in the appended claims, the manner of its organization and the mode of its operation will be better understood by referring to the following description read in conjunction with the accompanying drawing forming a part thereof, in which Fig. 1 is a side elevational view of the invention attached to a wall or door of a motor vehicle and showing the various positions of adjustment thereof;

Fig. 2 is a plan view of the invention;

Fig. 3 is a cross-sectional view of the signaling device showing the internal operating elements thereof; and Fig. 4 is a detail view of the control handle of the device taken along the line 4—4 of Fig. 3.

Referring now to the figures in which like numerals identify the same elements, the signal comprises a fixed section composed of portions 5—5' located on each side of a wall or door 6 of a motor vehicle, a movable forearm section 7 and a hand section 8. As shown in Fig. 1, the portions 5—5' are stationary, which corresponds to the operator's upper arm, while the section 7, corresponding to the operator's forearm, is movable into four positions while the hand portion 8 is also movable to four positions as shown by the dotted lines in Fig. 1.

The positions of the controlling handle 10 are shown corresponding to the four signal positions. That is, the solid line positions of sections 7 and 8 correspond to the solid line position of the handle 10, while dotted-line positions 7'—8' correspond to handle position 10', dotted-line positions 7"—8" correspond to handle position 10", and dotted-line positions 7'''—8''' correspond to dotted-line handle position 10'''. It will be noted from these various positions that the arm has an elbow action at the pivot point 15 and a wrist action at pivot point 16.

Referring now particularly to Fig. 3 showing the signal in the 7'—8' position of Fig. 1, the device is mounted on the wall 6 by two hollow mounting rods 18 and 19 passing through holes in the wall 6 and attached at one end to a web member 21 of the section 5. The other ends of the mounting rods pass through an end plate 22 of the section 5'. Nuts 24 and 25 are threaded upon the latter ends of the hollow rods 18 and 19, respectively, for tightening and holding the signal in position on the wall. This is all the mounting required for affixing the signal to any vehicle.

The section 7 is mounted on a pivot 15 which is eccentrically disposed with respect to the center of curved end of section 5 and the center of the curved end of section 7. The section 7 is hollow, the lower edge being open from the point 28 to the point 29 to permit movement of the section 7 about pivot 15. The extended end of the section 7 is also circular and open but is flanged to permit the insertion of the circular end of the hand section 8 which is mounted upon the pivot bolt 16 which is centered with respect to these two curved end sections.

The sections 7 and 8 are adjusted to their respective signaling positions by a connection from a disc member 32 integral with a handle 33, the disc being rotatable about an axle bolt 34. A flange 35 on the disc 32 has a hole therein to accommodate a connecting link 36, the other end of the link being attached to a horizontal rod 37 adapted to slide within the tube 19. The rod 37 is made of two sections adapted to be threaded together as shown at 38 so as to be adjustable to the proper length in accordance with the width of the wall 6. Continuing along the mechanical connection, the left-hand end of the rod 37 is pivoted to a curved link 40 which is attached to and pivoted on a rivet or rod 41 passing between the sides of the section 7. Thus, any rotation of the disc 32 will transmit motion to the arm 7 through the two links 36 and 40 and the rod 37. It is to be noted that this is a positive connection so that movement of the section 7 in either direction is under the direct control of the handle 33.

With movement of the section 7, the hand section 8 is also moved but at a different rate from that of section 7. This is accomplished by the use of a connecting arm or link 43 fixedly connected to the section 5 by a pin or rivet 44 and to the arm 8 by a pin or rivet 45. Thus, movement of the section 7 will not only bodily translate the hand section 8, but will rotate it about the pivot 15 at a different rate from the rotation of the section 7 about the pivot point 15, as shown in Fig. 1. This differential motion is caused by the eccentric positioning of the pivot point 15 with respect to the centers of the connecting ends of sections 5 and 7 and the shape and eccentric connection of the arm 43 to the fixed section 5 and to the movable hand section 8. A slot 46 is provided in the section 7 to accommodate the pin 44 in the section 5 as the arm 7 is rotated. By curving the end of rod 43 and the link 40 and by the proper connections thereof to sections 5, 7 and 8, a reversible wrist motion is obtained with an intermediate straight arm position and a straight arm rest position.

With this construction, right, left, and stop signals may be given which are identical with the proper hand signal indications, each signaling position being under the positive and direct control of the handle 33. Referring to the handle portion, it will be observed that the curved end of the section 5' contains a series of notches 48, 49, 50 and 51. These notches are provided to accommodate the end 53 of a latching member 54 pivoted at 55 between the flanges of the handle 33, the end 53 being urged into the notches by a compression spring 57. It will also be noted that not only is the end 53 urged into the notch by the spring 57, but the weight of the movable arm sections 7 and 8 has a tendency to lock the end 53 into any particular notch in which it is positioned so that vibration or jarring of the signal by the car movements will not change the signal setting. This permits the operator to give his undivided attention to the driving of the motor vehicle instead of having to hold one hand on the signaling device. Thus, an operator, as he approaches a corner or decides to stop, may simply adjust the signaling device to the correct position, as shown in Fig. 1, and then forget the signal until he has made the indicated maneuver. This is a safety feature not found in many signaling devices of this type.

It is also to be noted that the unlatching of the signal from any adjusted position is quickly and readily accomplished by simply grasping the handle 33 over the member 54, the member 54 being squeezed to within the guard flanges of the member 33. Thus, only one hand is required to both unlatch and adjust the signaling arm in contrast to the use of a separate locking arm as shown in Patent 2,081,805. A cover plate 56 is provided for the section 5'.

Referring now to the disc 32, Fig. 4 shows that this disc has an upset central section 58 which has a flattened section 59 to provide a cam action. Upon this upset portion 58 rests an insulated end of a conducting switch element 60 under pressure of a spring 61. Thus, when the handle 33 is in its rest position shown at 10''' in Fig. 1, the switch arm 60 will be positioned on the flat section 59 and an electrical contact at 62 will be broken. As soon, however, as the disc 32 is rotated by the handle 33, the switch arm 60 will be raised and electrical contact made. The making of the electrical contact is adapted to energize a lamp 63 positioned in the hand section 8 over conductor 64 passing through the tubular member 18 to the pivot point 15 which is an electrical, insulated member. From point 15 an insulated conductor 65 extends to the lamp 63 while a similar conductor 66 extends from the lamp to the point 28, where it is grounded. Thus, it is only necessary to connect the signal to an insulated post at point 67 (see Fig. 2) and a circuit is made through the lamp 63 when the signal arms are adjusted to any one of the left-hand, right-hand or stop positions. The signal is thus suitable for night driving.

The hand 8 is made of a translucent material which will glow when the lamp 63 is energized. A plate 68 is provided on the hand 8 which may be removed to provide access to the lamp 63 for the removal or exchange thereof. A cover plate 69, as shown in Fig. 2, is to protect the portion of conductor 64 which is located externally of the section 5, as shown by the dotted lines in Fig. 3.

It will be noted that the upper portions of the sections 5, 7 and 8 are substantially closed to prevent excess moisture from getting to the operating points of the device, the device thus being suitable to operate in inclement weather. In fact, the device has operated satisfactorily in freezing temperatures after water has been thrown on the signal. By providing the proper actions of the sections 7 and 8 to correspond with the proper hand signals makes the device particularly suitable for inexperienced operators who are not accustomed to giving correct signals. It also prevents the careless giving of signals, as occurs in many instances. Indicia such as is shown at 70 may be provided so that it is only necessary to position the handle 10 at the proper index to provide the proper signal. Furthermore, the positive and direct action employed for adjusting the signal avoids any false positioning in the event of binding or tight joints. The hand section may also have a color different from the section 7 or sections 7 and 5 to increase the visibility of the signal.

What we claim as our invention is:

1. An articulated vehicle signal comprising a fixed section, an intermediate section eccentrically pivoted at one end thereof to one end of said fixed section, a terminal section having one end thereof centrally pivoted to the other end of said intermediate section not connected to said fixed section, a rotatable member in the other end of said fixed section not connected to said intermediate section, a rod connected to said rotatable member and to said intermediate section, a second rod connected to said fixed section and to said terminal section and a slot in said intermediate section to accommodate the connection of said second-mentioned rod to said fixed section, the adjacent end portions of said rods being concavely curved toward one another, the point of connection of said second mentioned rod to said fixed section being nearer said eccentric pivot point than the point of connection of said first mentioned rod to said intermediate section.

2. A vehicle signal comprising a fixed section, a movable arm section, and a movable hand section, said fixed section having two parts, one part being adapted to be mounted on the inside of a wall of said vehicle and the other part on the outside of said wall, a pair of tubular members passing through said wall for fastening said parts together and to said wall, an eccentric pivot connecting said arm section to the part of said fixed section mounted on the outside of said wall, a rod passing through one of said tubular members for rotating said arm section, a second rod passing through said arm section for rotating said hand section a different amount from that of said arm section when said arm section is rotated, and a slot in said arm section to accommodate the connection between said second rod and said part mounted on the outside of said wall.

3. A vehicle signal in accordance with claim 1 in which a lamp is provided in said hand section and a conductor for energizing said lamp is contained in said other tubular member.

4. A vehicle signal comprising a fixed section of two portions, one portion on the outside and the other portion on the inside of a supporting wall of said vehicle, a pair of tubular members passing through said wall for connecting said portions and fastening said portions to said wall, a handle on said inside portion, arm and hand sections pivoted together, said arm section being pivoted to said outside portion, a rod through one of said tubular members pivotally connecting said handle and said arm section, a second rod through said arm section pivotally connecting said hand section and said outside portion, the adjacent end portions of said rods being concavely curved toward one another and said arm section having a slot therein to accommodate the pivotal connection of said second rod to said outside portion, a lamp in said hand section, a switch under control of said handle, and an electrical conductor through said other tubular member connecting said lamp and said switch.

JOSEPH B. HOLMES.
LOUIS H. TILEY.